2,858,580

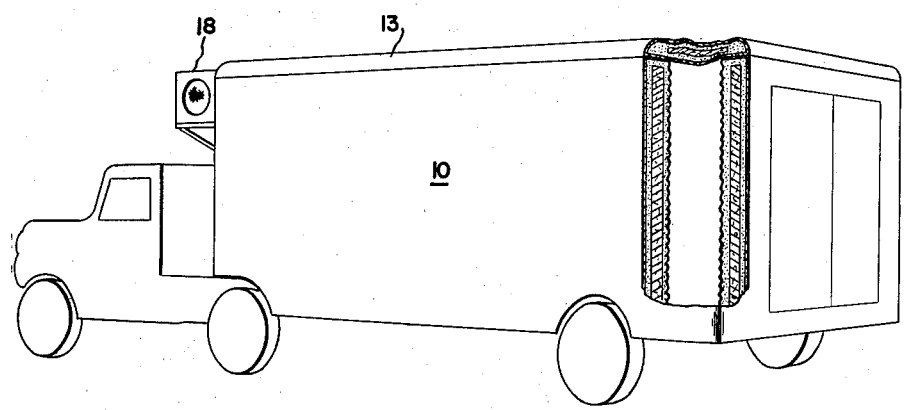
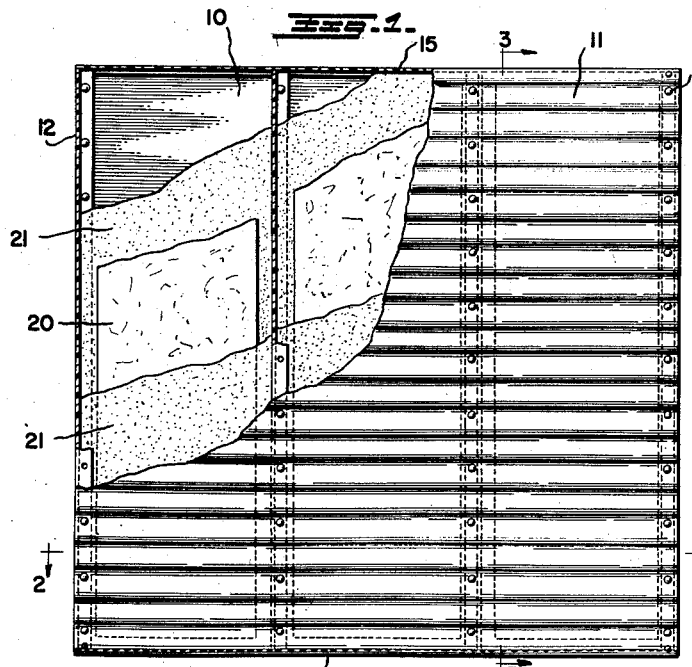
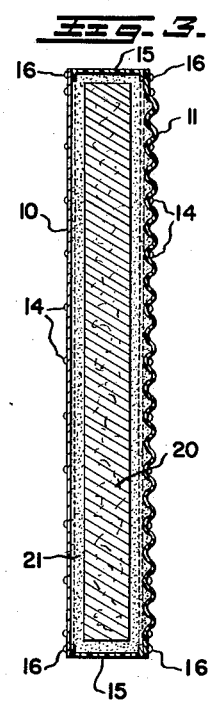
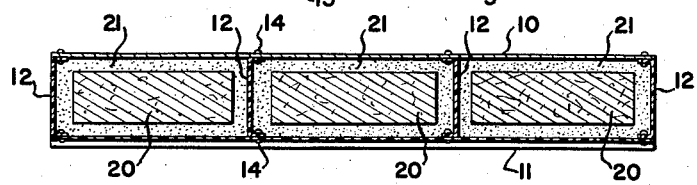
INVENTORS
ROBERT E.S. THOMPSON
EDWIN V. BISHOP
BY
ATTORNEYS

THERMALLY INSULATING TRUCK VAN WALLS

Robert E. S. Thompson, Owings Mills, and Edwin V. Bishop, Sparks, Md., assignors to Thompson Trailer Corporation, Pikesville, Md., a corporation of Virginia Application February 2, 1956, Serial No. 563,063

4 Claims. (Cl. 20—2)

This invention relates to structures useful for insulating a cold zone. In a particular aspect our invention is concerned with the insulation of truck vans for storing and transporting refrigerated articles.

Refrigerated truck vans have long been in general use; however, because of the increasing consumption of frozen foods wider utilization of refrigerated vans is being experienced. Due to the storing of frozen foods for long periods of time during transportation, it is a necessity that the refrigerated vans be able to establish and maintain temperatures low enough to prevent thawing of the food which would result in deterioration unless consumed immediately. The optimum temperature for storing many foods is below about 0° F. e. g. about 0 to —10° F.

Typically, the walls of a refrigerated van are constructed with a metallic outer skin such as aluminum which is essentially impervious to water and water vapor and which provides some protection against physical deterioration and punctures by objects such as tree limbs. The inner skin of the wall may be comprised of aluminum or a more water vapor pervious material such as plywood. The middle of the insulating wall is composed of a low heat conducting material such as Fiberglas. Structural rigidity is provided by struts passing from the inner to the outer skin components. These struts can be composed of a metal such as aluminum but to avoid excessive conduction of heat the inner portion of the struts next to the inner skin of the wall is usually made of wood.

Refrigerated vans of this general type of construction have failed in providing and maintaining zero temperatures. Aside from unavoidable losses of heat through the shell and insulation, heat gain occurs by infiltration of warm air and permeation of water and water vapor into the insulated wall cavity. Air infiltration into the insulation and into the refrigerated van is augmented by the twisting and other movements of the van when in motion which cause a constant intake and discharge of air as through seams and around rivets.

In addition to heat loss due to direct infiltration there is a serious problem of moisture condensation within the insulation which reduces the efficiency of the cooling operation and eventually prevents the maintenance of temperatures materially below 32° F. When water or water vapor enters the insulating cavity as around rivets and through punctures in the van's outer wall, it migrates to the cold inner surface where it condenses and freezes. If the inner skin is permeable to water vapor, a portion of the vapor passes into the central van cavity. In spite of this, sufficient water condenses on the cold inner surface next to the insulation to present a real problem.

In time the ice layer on the inner surface builds up and its thickness is limited only by the capacity of the refrigerated unit to maintain the ice frozen to its outermost surface in the insulation which is under equilibrium conditions at about 32° F. When the thickness of the insulated wall and refrigeration capacity are within reason, the thickness of the ice and the capacity of the refrigeration unit have little bearing on the temperature of the central van cavity which cannot be maintained materially below 32° F. due to the presence of the water-ice interface in the insulation. Also, if the ice builds up until it bridges the wooden portion of the strut between the inner and outer surfaces of the insulated wall, there is established a high heat conductivity path which in effect cancels out or by-passes the insulation present giving rise to further heat losses. The consequence of these seceral factors is that maintenance of temperatures in the van of the order of 0° F. for extended periods becomes impossible and the insulation must be replaced periodically.

Another problem raised by the presence of water and ice in the van insulation is the weight gain. Available figures establish that a refrigerated van may gain upwards of a thousand pounds during use due to accumulated moisture. The weight gain in the first three to four months of van life is of the order of three to five hundred pounds. The disadvantages of this weight gain on the mechanical operation of the van are apparent.

The present invention provides a structure for insulating a cold zone which is highly advantageous while mitigating against the disadvantages of prior structures noted above. We provide for an insulating wall which is comprised of an outer skin of material essentially impervious to water vapor. This material is rigidly held by struts connected to an inwardly spaced sheet material which is relatively pervious to water vapor. Disposed between the inner and outer skin materials is an especially designed insulating material. This material is comprised of a core of flexible, low heat conducting material entirely surrounded by a layer of an expanded or foamed organic resin which is relatively impermeable to water and water vapor. Furthermore, the expanded resin is intimately bound to the inner and outer skin members and struts of the insulating wall by virtue of the curing of the foamed resin in-situ, i. e. while in contact with these structural members.

The bound resin effectively seals air, water vapor and water passages through either the inner or outer skin members presented by pucture holes, seams, rivets, etc. Accordingly, heat losses which would normally occur by infiltration of air and condensation of water on the insulation side of the inner skin are materially reduced, which permits the maintenance of temperatures of the order of 0° F. in the refrigerated zone being insulated while employing wall thicknesses of reasonable width, e. g. 4 to 6 inches. The resin, although light, provides structural strength to the insulating walls.

Advantageously, our insulating walls are used to form a truck van. Particularly, in this form of the invention the use of the flexible core resin formed in-situ is important since this structure materially prevents the separation of the resin from the inner and outer skins and connecting structs while avoiding through cracks in the resin while the van twists, turns and goes through other movements during travel over the road. Thus the insulating structures maintain their effectiveness against air and water ingress and avoid the usually resulting losses in refrigeration efficiency to permit the maintenances of below freezing temperatures in the van over extended periods of time while employing economically sized refrigeration units and wall thicknesses. The insulated structure is also useful in vans which are designed to keep very low temperature materials below freezing without the provision of extraneous refrigeration units.

Our invention will be described further in connection with the accompanying drawing in which:

Figure 1 is a front view of our insulated panel with parts broken away;

Figure 2 is a cross-sectional view taken along line 2—2 of Figure 1;

Figure 3 is a cross-sectional view taken along line 3—3 of Figure 1; and

Figure 4 is a view of a semi-trailer having the walls of its van comprised of our insulated panels with one corner of the van broken away for illustration of the panel structure.

The insulated panel or wall section comprises a rigid outside peripheral sheet member 10 which is relatively impermeable to water and water vapor and can be made of aluminum, steel, magnesium, rigid water-proofed or water impermeable resin sheet, etc. Wall member 10 is held by vertical struts 12 in spaced relationship from a rigid inside peripheral sheet member 11 which is relatively permeable to water vapor and can be constructed for instance of Vinylite (vinyl acetate-vinyl chloride copolymer), plywood or other suitable material. We preferably employ corregated inner wall members in forming the floor, ceiling and walls of a refrigerated area such as a semi-trailer or other truck, to provide air spaces for the cool air to circulate around the articles being refrigerated by a suitable unit 18. Usually, the members 10 and 11 are less than one inch thick. Struts 12 are channel-shaped and the walls 10 and 11 are held to the struts by rivets 14 or other suitable means. The struts are composed of a rigid material of low heat conductivity such as plastic, wood, etc. If desired, only the inner portion of the struts are composed of such material with the portion attached to wall 10 being metallic. In any event the struts should not be made entirely of a material which is a good heat conductor as this would result in high loss of refrigeration from any enclosed refrigerated chamber. Struts 12 can divide a wall section into a number of separate compartments. The struts need not be vertically disposed but can be in any position desired, e. g. they can be diagonally positioned. Regardless of position they provide a space between the wall members 10 and 11 and add structural rigidity and strength. The top and bottom of the wall section can be capped by channel struts 15 which are held to wall members 10 and 11 by rivets 16.

The spaces between members 10 and 11 are filled by a specially designed insulation member. This member is comprised of a central core 20 of relatively flexible material of low heat conductivity. Entirely surrounding the core is a cellular organic resin 21 which is relatively impermeable to water and water vapor. It is a necessity in the present invention that the resin be intimately bound with the struts 12, wall members 10 and 11, and preferably struts 15 when provided. The intimate bond is provided by forming the resin in-situ, i. e. the resin must be foamed or blown and cured while it is in place between members 10 and 11. Particularly in view of the bonding attachment the cellular insulating material adds structural strength to the wall member. Further, the foamed organic resin combats the ingress of water vapor through seams and around rivets when the insulated wall members are constructed to form a refrigerated compartment. Thus, the tendency to produce an ice layer on the inside of wall 11 next to the refrigerated zone is materially reduced which makes it possible to maintain temperatures as low as 0° F. in the zone when using walls of reasonable thickness. Should any small amount of water vapor migrate to wall 11 it can pass into the refrigerated zone to mitigate against the formation of an ice layer which as previously discussed can be ruinous when trying to maintain temperatures of the order of 0° F.

Generally, the insulated panel will have a thickness of about 3 to 8 inches with the central core being about 2 to 4 inches. All walls of the foamed resin will have a thickness of at least about ½ inch, and preferably are not over about 2 inches thick. As the foamed resin is resistant to water ingress, it provides protection against such ingress due to puncturing of wall 10 as by tree branches when the wall is part of a refrigerated van. Also, should the inside wall 11 become punctured, water ingress can be prevented as when washing out the refrigerated chamber. The resin insulating member is substantially odorless and vermin proof, which are important considerations.

The cored, foamed resin insulating member described is particularly advantageous when the refrigerated zone is wheel mounted for transporting as on a truck. This is shown in Figure 4 where all enclosing walls of the truck including the floor and overhead can be formed of our insulating structure. While being transported, the walls surrounding the refrigerated zone are subjected to a wide variety of movements and should an insulation member be rigid it is apparent that through cracks or holes can form to allow the ingress of water and water vapor. In the present invention, the flexible insulating core inside the foamed resin provides flexibility to the walls of the refrigerated van which prevents the formation of such cracks. Thus, we provide an insulating wall section which is strong, impervious to water vapor and water and yet is sufficiently flexible not to be cracked and rendered ineffective when subjected to movements normally associated with a refrigerated van.

The cellular organic material can be any of the resins which are adaptable to being blown to form relatively water and water vapor resistant, rigid cell structures. Exemplary of such materials are polystyrene and the polyurethanes. The latter are particularly advantageous and are comprised of an alkyd resin-polyisocyanate reaction product. A method of constructing our insulating wall members is to apply the reactant cellular plastic mixture on the wall members 10 and 11 and struts 12 and lower strut 15. As the alkyd resin-polyisocyanate reaction product is formed, released carbon dioxide starts expanding the cellular structure. Before this reaction takes place to an appreciable exent the insulating core 20 is placed next to the wall members and supporting struts. The reaction mixture can then be applied to the upper strut 15 which is then placed over the top of the core to complete the enclosing structure. As the cellular structure is formed the core may be compressed somewhat and becomes completely surrounded and enclosed by the rigid cellular structure which also becomes intimately bound with wall members 10 and 11, struts 12 and 15, and around the rivets holding them. In applying the resin-forming ingredients to the struts and wall members it is of course desirable that the reaction be effected almost entirely after the reaction mixture is applied. Since for practical purposes the cellular structure must cure at room or working temperature, e. g. preferably 70° F. and below about 125° F. a catalyst such as benzyl peroxide is employed. Also, it is desirable to use an accelerator such as metallic soap powders. These soaps are usually zinc, aluminum and alkaline earth metal salts of stearic, oleic and lauric acids. Obviously, the alkyd resin, polyisocyanate, catalyst and, if used, the accelerator cannot be mixed far in advance and then sprayed, brushed or otherwise applied at some indeterminate future time as such mixture would have a short pot life. Rather it is desirable to mix the ingredients in the nozzle of a spray gun or in a line leading to the nozzle. Thus, the reactant mixture is applied in the substantially unreacted state.

As is well known the alkyd resins are formed from polyhydric alcohols and polybasic acids and the polyurethanes are provided by reaction of the alkyd resins with polyisocyanates. Suitable reactants are listed in U. S. Patents Nos. 2,282,827, 2,620,349 and 2,706,311 and the latter two patents discuss various aspects of providing cellular structures. A suitable alkyd resin is formed from four moles of glycerol, two and one-half moles of adipic acid and one-half mole of phthalic anhydride. In providing the reaction mixture, three parts by weight of the resin are mixed with two parts of metatoluene diisocyanate, two-tenths parts of zinc stearate powder and twenty-five thousandths parts of benzoyl peroxide. The alkyd resin is passed to the spray gun and mixed in its barrel just before the spray head with the diisocyanate containing the peroxide and stearate. Sufficient of this mixture is applied to the walls 10 and 11 and struts 12 and 15 to provide a complete but thin cover. The core, say a Fiberglas batt, is then put in place and the structure is capped by upper strut 15 as the resin expands and cures at room temperature.

The core of our insulating wall is flexible and is comprised of a material of low heat conductivity, e. g. having a K of not more than about 0.3 B. t. u./hr./° F. of temperature differential/square foot/inch of thickness. Representative of core materials are inorganic and organic materials such as Fiberglas, rock wool, asbestos, foam rubber, cork, etc., which are dissimilar to the organic resin surrounding the core. Fibrous core materials such as Fiberglas are preferred.

Having described our invention we claim:

1. An insulated wall which comprises a rigid outer sheet member which is relatively impervious to water vapor, a rigid inner sheet member which is pervious to water vapor, spaced apart struts extending between and connected to each of said inner and outer sheet members, said struts being constructed of material of low heat conductivity at the ends connected to said inner sheet member, a cored insulation member intimately bound to said inner and outer sheet members and said struts and formed of a core of flexible material of low heat conductivity having a K factor not greater than about 0.3 and entirely surrounded by a foamed organic resin which is relatively impermeable to water vapor, said foamed organic resin serving to provide the intimate bond by virtue of the resin being cured while in contact with said inner and outer sheet members and said struts.

2. The structure of claim 1 wherein the core is a fibrous material.

3. A truck having insulated walls forming a closed compartment supported on wheels, said walls being comprised of a rigid outer sheet member which is relatively impervious to water vapor, a rigid inner sheet member which is pervious to water vapor, spaced apart struts extending between and connected to each of said inner and outer sheet members, said struts being constructed of material of low heat conductivity at the ends connected to said inner sheet member, a cored insulation member intimately bound to said inner and outer sheet members and said struts and formed of a core of flexible material of low heat conductivity having a K factor not greater than about 0.3 and entirely surrounded by a foamed organic resin which is relatively impermeable to water vapor, said foamed organic resin serving to provide the intimate bond by virtue of the resin being cured while in contact with said inner and outer sheet members and said struts.

4. The structure of claim 3 wherein the core is a fibrous material.

References Cited in the file of this patent

UNITED STATES PATENTS

| | | |
|---|---|---|
| 2,108,682 | Leslie | Feb. 15, 1938 |
| 2,245,611 | Schultz | June 17, 1941 |
| 2,376,653 | Boyer | May 22, 1945 |
| 2,642,818 | Talmey | June 23, 1953 |